United States Patent
Brooks, Jr.

(10) Patent No.: US 7,971,992 B1
(45) Date of Patent: Jul. 5, 2011

(54) EYEWEAR WITH INTERCHANGEABLE COMPONENTS

(76) Inventor: Byron A. Brooks, Jr., Sandersville, GA (US)

( * ) Notice: Subject to any disclaimer, the term of this patent is extended or adjusted under 35 U.S.C. 154(b) by 0 days.

(21) Appl. No.: 12/697,616

(22) Filed: Feb. 1, 2010

(51) Int. Cl.
*G02C 1/02* (2006.01)

(52) U.S. Cl. ............ 351/110; 351/111; 351/121

(58) Field of Classification Search .......... 351/41, 351/111, 121, 110, 140
See application file for complete search history.

(56) References Cited

U.S. PATENT DOCUMENTS

| | | |
|---|---|---|
| 5,189,447 A | 2/1993 | Oleson |
| 5,471,257 A * | 11/1995 | Houmand ............ 351/86 |
| 5,880,807 A | 3/1999 | Devercelli |
| 6,250,755 B1 | 6/2001 | Conner et al. |
| 6,439,717 B2 | 8/2002 | Weber |
| 6,447,117 B1 | 9/2002 | Estrada et al. |
| 6,502,940 B1 | 1/2003 | MacIntosh, Jr. |
| D473,893 S | 4/2003 | Wang-Lee |
| 6,767,096 B2 | 7/2004 | Hiramoto |
| 6,860,597 B2 | 3/2005 | Carlon |
| 6,896,367 B1 | 5/2005 | Sohn |
| 7,048,373 B2 | 5/2006 | Yamaguchi et al. |
| 7,264,348 B2 | 9/2007 | Perie |
| 2005/0094091 A1 | 5/2005 | Hsu |

FOREIGN PATENT DOCUMENTS

JP 7218869 8/1995

* cited by examiner

*Primary Examiner* — Huy K Mai
(74) *Attorney, Agent, or Firm* — Hope Baldauff Hartman, LLC

(57) ABSTRACT

Apparatus and methods described herein provide for an eyewear system having interchangeable components. According to one aspect of the disclosure provided herein, eyewear includes at least one lens structure and a temple that are configured to removably attach to one another. The lens structure includes two engaging elements with one attached to the lens structure towards the center and the other toward the temple. The temple includes two curved portions shaped to secure the temple to the engaging elements of the lens structure.

19 Claims, 5 Drawing Sheets

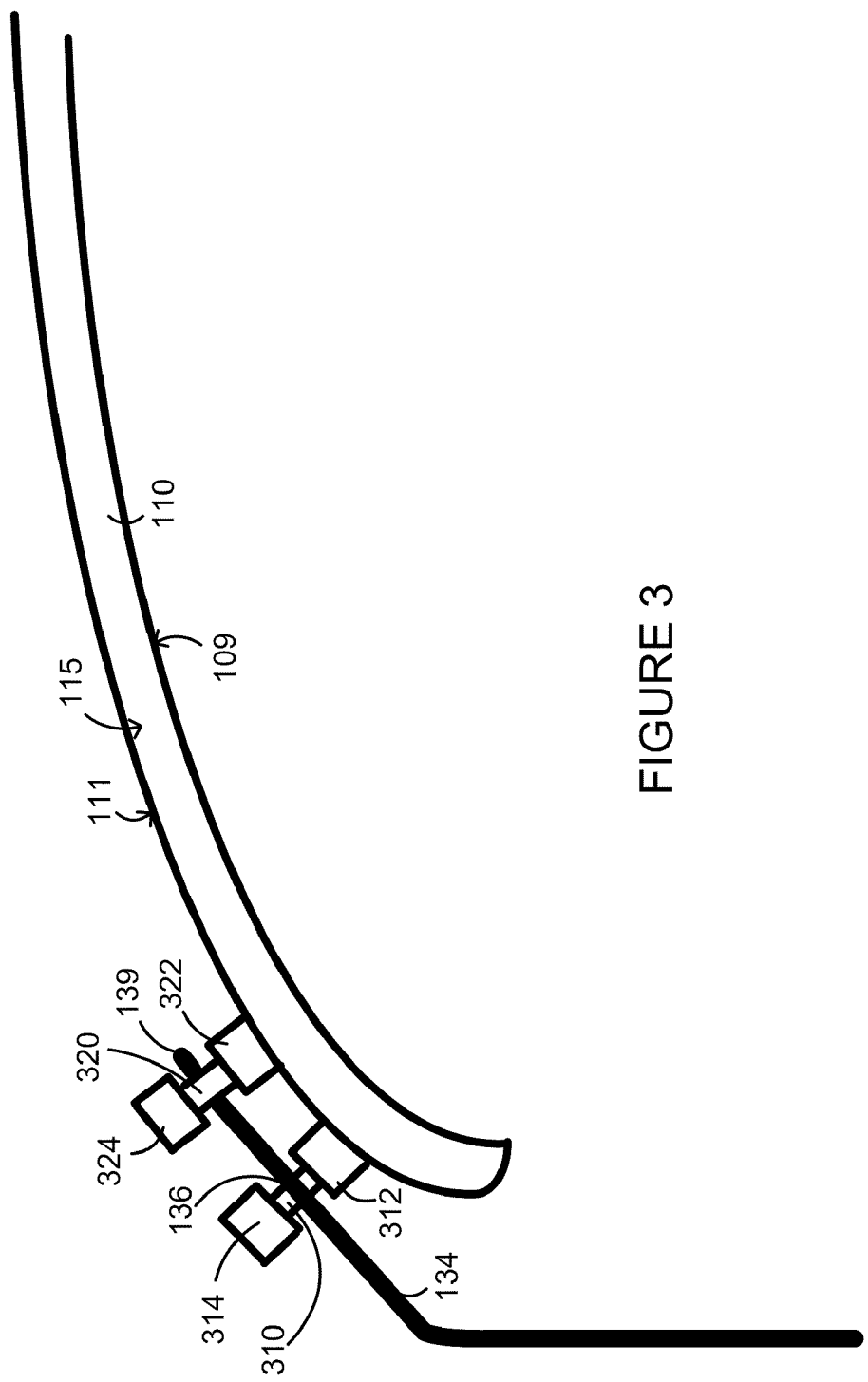

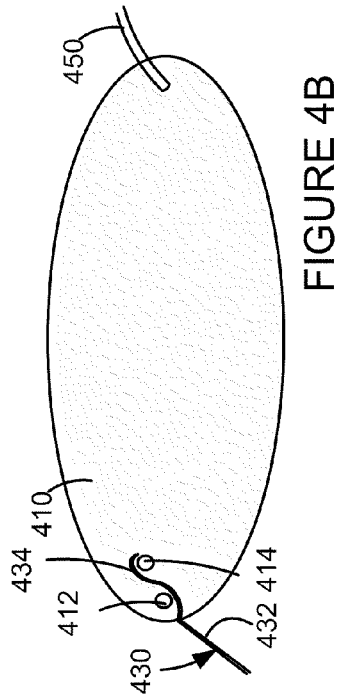
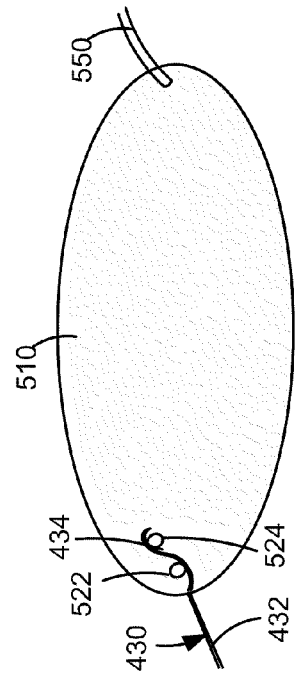
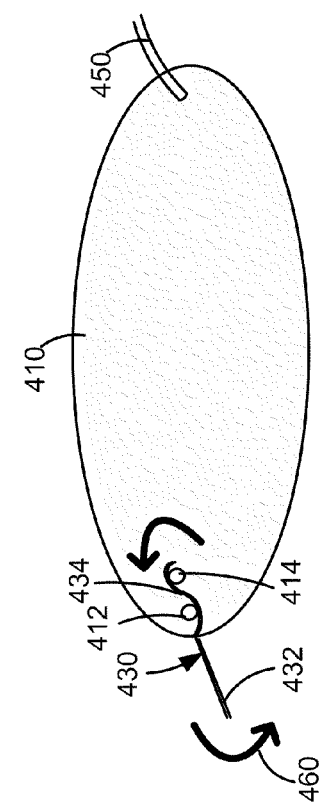
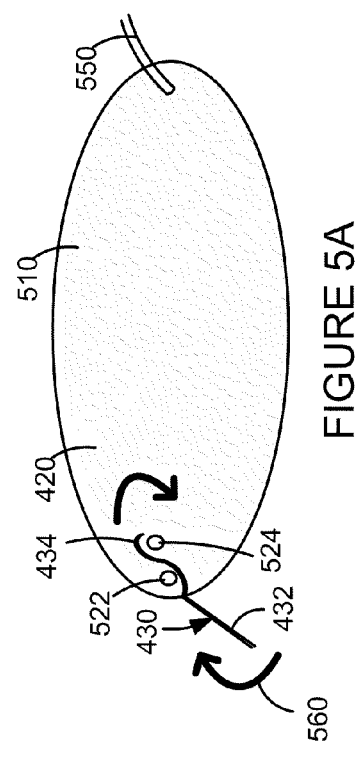

EYEWEAR WITH INTERCHANGEABLE COMPONENTS

TECHNICAL FIELD

Exemplary embodiments are related to eyewear. More particularly, exemplary embodiments relate to eyewear with interchangeable lenses and/or temples.

BACKGROUND

Eyewear systems having interchangeable lenses allow users to use an eyeglass frame with multiple interchangeable lenses. For example, outdoor sportsmen often change the lenses of their protective eyewear to account for varying lighting characteristics according to their personal preferences. However, these eyewear systems either require tools to replace one set of lenses with another set of lenses, or are difficult and cumbersome to assemble. Some eyewear systems have multiple parts, such as washers, screws, caps and the like, which may be problematic while exchanging one set of lenses with another set. In addition, conventional eyewear systems often require a significant amount of time to change lenses, which may become undesirable when the lenses need to be interchanged frequently or quickly. It is with respect to these reasons that the present disclosure is described herein.

SUMMARY

It should be appreciated that this Summary is provided to introduce a selection of concepts in a simplified form that are further described below in the Detailed Description. This Summary is not intended to be used to limit the scope of the claimed subject matter.

Apparatus and methods described herein provide for an eyewear system having interchangeable components. According to one aspect of the disclosure provided herein, eyewear includes at least one lens structure and a temple that are configured to removably attach to one another. The lens structure includes two engaging elements with one attached to the lens structure towards the center and the other toward the temple. The temple includes two curved portions shaped to secure the temple to the engaging elements of the lens structure.

According to another aspect, a method for making eyewear having at least one lens structure and a temple that are configured to removably attach to one another. The method includes forming two engaging elements on the lens structure, with one positioned closer to the center of the lens structure and the other toward the temple. The method also includes forming a tip portion having two curved portions on the temple, which are shaped to engage with the corresponding engaging element formed on the lens structure.

According to yet another aspect, an eyewear system includes more than one pair of lens structures and a corresponding pair of temples that are configured to attach to each other. Each pair of lens structures includes two lens structures and a bridge that connects the two lens structures to each other. Each lens structure has two engaging elements, with one positioned closer to the center of the lens structure and the other toward the temple. Each of the corresponding temples includes an elongated portion and an S-shaped tip portion that is shaped to secure the temple to the engaging elements of the corresponding lens structure.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIG. 3 shows a bottom view of the lens structure shown in FIG. 2, according to various embodiments;

FIGS. 4A-4B illustrate a temple and a lens structure during removal of the temple from the lens structure, according to various embodiments;

FIGS. 5A-5B illustrate a temple and a lens structure during removal during attachment of the temple from the lens structure, according to various embodiments.

DETAILED DESCRIPTION

Figure 1:
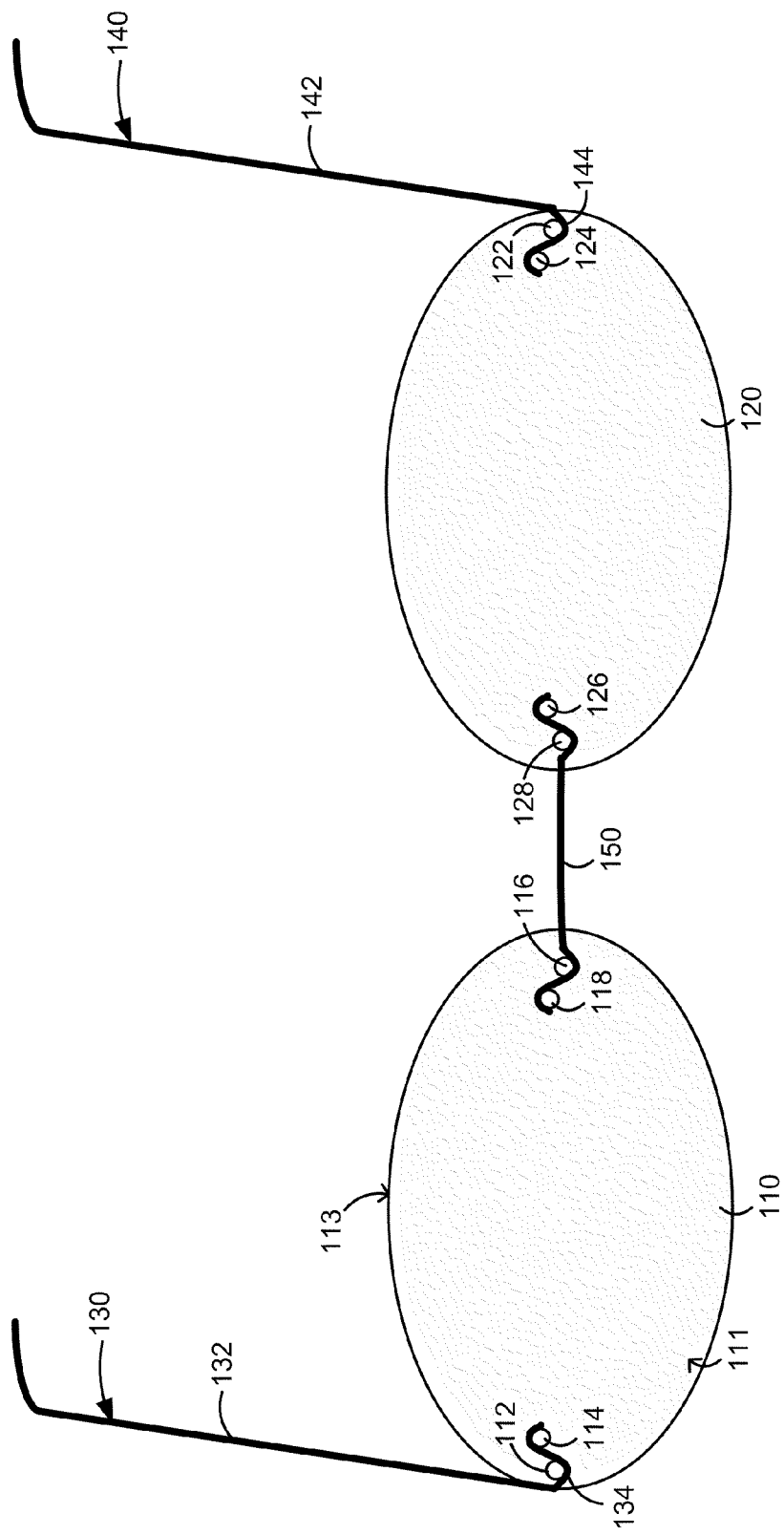
FIG. 1 shows a front view of an eyewear, according to various embodiments.

The following detailed description is directed to apparatus and methods for an eyewear system having interchangeable components. The eyewear system may allow a user to quickly and easily interchange a set of lenses or temples according to the preferences of the user. For instance, on a typical day, the user may want to change out of his prescription lenses and into tinted lenses when he walks out of a building on a sunny day. He may then want to change out of his tinted lenses into a thicker set of lenses when he plays racquetball. In addition, he may also want to change out the set of temples with a set of temples that have a rubber grip and straps attached to the back to prevent the eyewear from falling while playing racquetball. By way of the present disclosure, a user may be able to interchange multiple set of lenses and/or temples associated with the eyewear in a much more efficient manner.

In the detailed description, references are made to the accompanying drawings that form a part hereof, and which are shown by way of illustration, specific embodiments, or examples. It should be noted that, in the detailed description, expression showing directions, such as "front and rear", "inner and outer", "left and right", and "up and down" expresses directions as worn by a person in a normal condition. Referring now to the drawings, like numerals will represent like elements through the several figures.

Figure 2:
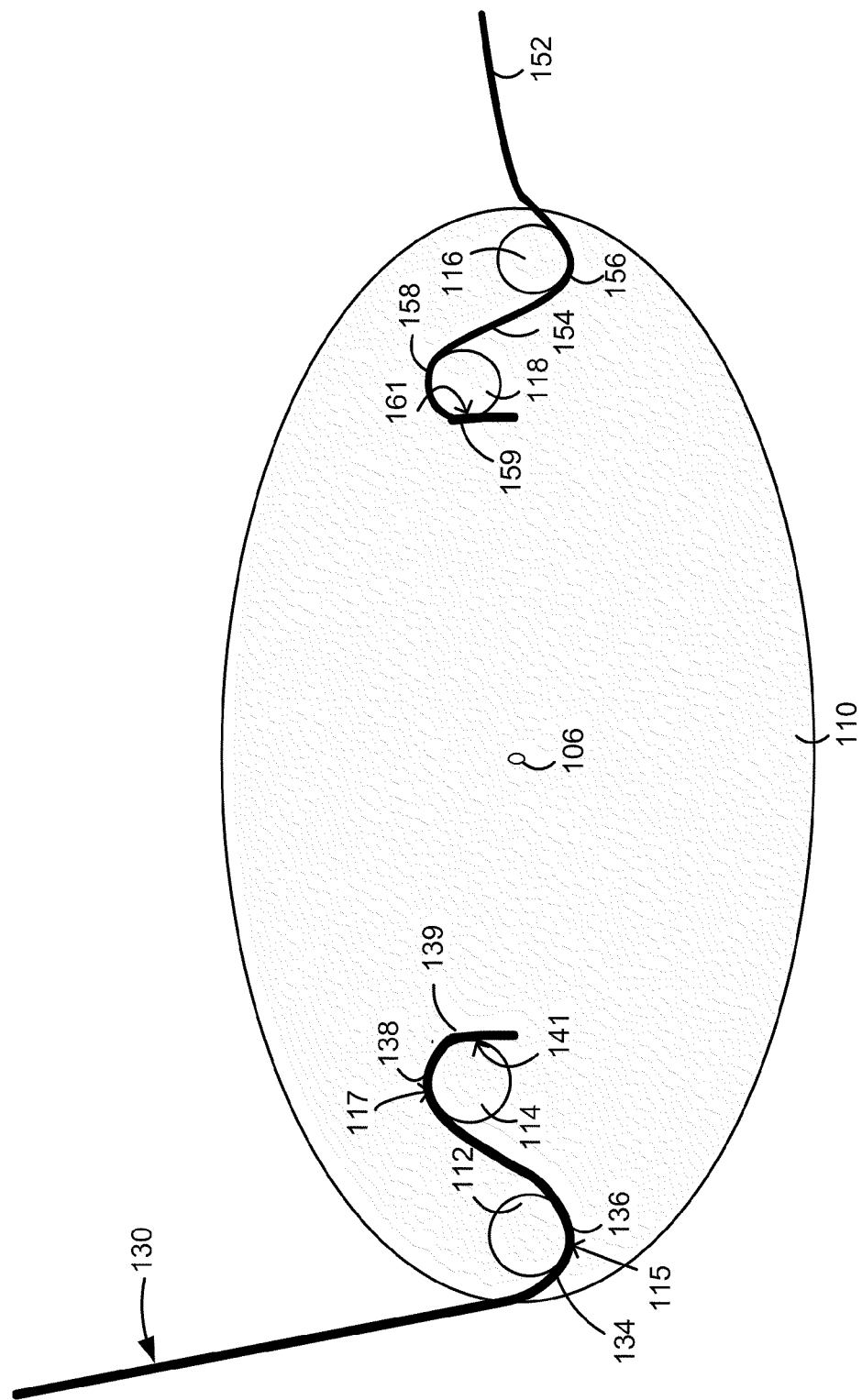
FIG. 2 shows an enlarged front view of a lens structure of the eyewear shown in FIG. 1, according to various embodiments.

Referring now to FIGS. 1 and 2, eyewear 100 having interchangeable components includes a first lens structure 110 associated with a first lens and a second lens structure 120 associated with a second lens that may be connected by a bridge 150. In various embodiments, each of the first and second lens structures 110, 120 may include a lens and a frame portion that encompasses the lens. In various embodiments, such as the embodiment shown in FIGS. 1 and 2, the eyewear is rimless, such that the first and second lens structures do not include the frame portions that encompass the lens. The eyewear 100 further includes a first temple 130 that may be removably attached to the first lens structure 110, and a second temple 140 that may be removably attached to the second lens structure 120. It should be appreciated that the right side of the eyewear may be symmetrical to the left side of the eyewear, and therefore, for ease of reference, the present disclosure may refer to either lens structure 110, 120 generally as lens structure 110 and to the elements associated with either lens structure 110, 120 using the reference numbers of the elements associated with the first lens structure 110.

The lens structure 110 includes an outer engaging element 112 and an inner engaging element 114, hereinafter referred to generally as engaging elements 112, 114. The engaging elements 112, 114 may be formed on the lens structure 110. In various embodiments, the engaging elements 112, 114 may be mounted on the front surface 111 of the lens structure 110 or in alternate embodiments, be defined within a thickness of the first lens structure 110. In various embodiments, the inner engaging element 114 is positioned relatively closer to a center 106 of the lens structure 110 than the outer engaging element 112, and the outer engaging element 112 is positioned relatively closer to the temple corresponding to the lens structure 110 than the inner engaging element 114, as shown in the figures. Moreover, the inner engaging element 114 may also be positioned relatively closer to a top edge of the lens structure 110 than the outer engaging element 112.

It should be appreciated that the engaging elements 112, 114 may be positioned close to an edge of the lens structure to which the temple 130 extends such that the temple 130 may engage with the engaging elements 112, 114 in such a manner as to minimize the obstruction to the view through the lens structure 110. As briefly mentioned above, the lens structures 110, 120 may include a frame portion. In embodiments where the lens structure does include a frame portion, the engaging elements 112, 114 may be formed on the frame portion of the lens structure 110. In this way, a person wearing the eyewear may be able to see through the lens without any obstructions due to the engaging elements 112, 114 being formed on the lens.

Still referring to FIGS. 1 and 2, the temple 130 includes an elongated portion 132 and a tip portion 134 that is configured to engage with the outer engaging element 112 and the inner engaging element 114 of the lens structure 110. The tip portion 134 includes a first curved portion 136 configured to engage with the outer engaging element 112 and a second curved portion 138 configured to engage with the inner engaging element 114.

According to embodiments, the first curved portion 136 extends from the elongated portion 132 of the temple 130 to the second curved portion 138 of the tip portion 134. The first curved portion 136 may also extend downwards such that the first curved portion 136 includes a first bend that is configured to engage with a bottom surface 115 of the outer engaging element 112. The second curved portion 138 begins at the end of the first curved portion 136 and may extend upwards such that the second curved portion 138 includes a second bend that is configured to engage with a top surface 117 of the inner engaging element 114.

In various embodiments, the second curved portion 138 also includes a securing element 139 that includes a flat surface 141 that may engage with a corresponding surface of the inner engaging element 114. In one embodiment, the flat surface 141 may engage with the left side of the inner engaging element 114, which is facing the center 106 of the lens structure 110. In this way, the tip portion 134 may securely engage the engaging elements 112, 114 such that the temple 130 does not disengage from the lens structure 110 until the securing element 139 is disengaged from the corresponding side of the inner engaging element 114.

Additionally, the elongated portion 132 of the temple 132 is configured to rest over the ear of the person wearing the eyewear 100. The elongated portion 132 may be formed such that when the temple is engaged with the lens structure 110, the elongated portion 132 lies in a plane that is about perpendicular to a plane on which the tip portion 134 lies, which is the plane of the front surface 111 of the lens structure 110. According to embodiments, the temple 130 may be made from a lightweight and flexible material, such as titanium. Constructing the temple using a flexible material may allow a person to change the angle between the elongated portion 132 and the tip portion 134. This may be useful when the temple 130 is rotated relative to the lens structure 110 to attach or remove the temple 130 from the lens structure 110, as will be described in detail below.

Still referring to FIGS. 1 and 2, the second lens structure 120 is similar to the first lens structure 110. The second lens structure 120 may also include an outer engaging element 122 and an inner engaging element 124 that are configured to engage with a tip portion 144 of a second temple 140, which similar to the temple 130, also includes an elongated portion 140. Similar to the lens structure 110, the second lens structure 120 may also include frames on which the mounting elements 122, 124 may be formed.

As shown in FIG. 1, the first lens structure 110 and the second lens structure 120 may also include bridge engaging elements, which may be configured to engage with the bridge 150. Specifically, the first lens structure 110 may also include a bridge outer engaging element 116 and a bridge inner engaging element 118, and the second lens structure may also include a bridge outer engaging element 126 and a bridge inner engaging element 128. These engaging elements 116, 118, 126, 128 are formed on the lens structure in a manner similar to the engaging elements 112, 114, but are positioned on the opposite side of the lens structure such that the bridge engaging elements 116, 118 are closer to the bridge 150.

In various embodiments, the bridge 150 may include a first tip portion 154 configured to engage with the bridge engaging elements 116, 118 of the first lens structure 110 and a second tip portion configured to engage with the bridge engaging elements 126, 128 of the second lens structure 120. According to embodiments, the tip portion 154 of the bridge 150 may include a first curved portion 156 and a second curved portion 158. The first curved portion 156 and the second curved portion 158 may be configured to engage with the bridge outer engaging element 116 and the bridge inner engaging element 118 respectively. According to embodiments, the first curved portion 156 extends from an elongated portion 152 of the bridge 150 to the second curved portion 158 of the tip portion 154. The first curved portion 156 of the tip portion 152 of the bridge 150 may extend downwards such that the first curved portion 156 includes a first bend that is configured to engage with a bottom surface of the bridge outer engaging element 116. The second curved portion 158 of the tip portion 152 of the bridge 150 may extend from an end of the first curved portion 156 and may extend upward such that the second curved portion 158 includes a second bend that is configured to engage with a top surface of the bridge inner engaging element 118.

In various embodiments, the second curved portion 158 of the tip portion 152 of the bridge 150 also includes a securing element 159 that includes a flat surface 161 that may engage with a corresponding surface of the bridge inner engaging element 118. In one embodiment, the flat surface 161 may engage with the right side of the bridge inner engaging element 118, which is facing the center 106 of the lens structure 110. In alternative embodiments, the bridge 150 may be permanently fixed to both the first lens structure 110 and the second lens structure 120 or connected via other interchangeable means that are different from the interchangeable manner described herein.

Turning now to FIG. 3, a bottom view of the lens structure 110 is shown. As described above, the outer engaging element 112 and the inner engaging element 114 may either be mounted on the front surface 111 of the lens structure 110, as shown in FIGS. 1 and 2, or defined within a thickness 115 of the lens structure 110. The outer engaging element 112 includes a first end 312 configured to attach to the lens structure 110 and a second end 314 separated from the first end 312 by a narrow stem 310 such that the second end 314 is wider than the narrow stem 310. In various embodiments, the first end 312 may be mounted on the front surface 111 of the lens structure 110, placed within the thickness of the lens structure 110 or mounted on a rear surface 109 of the lens structure 110. In embodiments where the engaging elements 112, 114 are defined within the thickness 115 of the lens structure 110, an aperture 135, as shown in dotted lines in FIGS. 1 and 2, may also be defined within the thickness of the lens structure 110 such that the tip portion 134 of the temple 130 may be received by the engaging elements 112, 114 for engagement. It should be appreciated that commonly known techniques may be used for defining engaging elements 112, 114 within the thickness of the lens structure 110.

In alternate embodiments, the outer engaging element 112 may not include a separate first end 312, such that the first end of the engaging element 112 is the end of the narrow stem 310 not connected to the second end 314 of the outer engaging element 112. In such embodiments, the first end of the outer engaging element 112 may be threaded into the lens structure 110. As long as the second end of the outer engaging element 112 is wider than narrow stem 310, the outer engaging element 112 along with the lens structure 110 defines a recessed portion that is configured to receive the first bend of the tip portion of the temple 130. The inner engaging element 114 is shaped similar to the outer engaging element 112 such that the inner engaging element 114 also includes a first end 322 and a second end 324 separated by a narrow stem 320 such that the second end 324 is wider than the narrow stem 320. In this way, the inner engaging element 114 along with the lens structure 110 defines a recessed portion that is configured to receive the second bend 138 of the tip portion 134 of the temple 130. In various embodiments, each of the engaging elements 112, 114 may define a recessed portion configured to receive the tip portion 134 of the temple 130. The recessed portion may be formed by having a narrow stem attached to a second end, or alternatively, by defining a recess within the engaging element. According to embodiments, the width of the recessed portions may be greater than the thickness of the tip portion 134 such that the tip portion 134 may fit within the recessed portions. It should further be appreciated that by sizing the recessed portions to be only slightly greater than the thickness of the tip portion 134, the likelihood of any movement of the tip portion 134 along the engaging elements 112, 114 may be greatly reduced.

It should be appreciated that although the tip portion 134 of the temple 130 may be S-shaped as shown in the figures, the tip portion 134 may include a U-shaped bend connected to an inverted U-shaped bend or a V-shaped bend connected to an inverted V-shaped bend. It should further be appreciated that the scope of the present disclosure is not limited to a tip portion having a particular shape of curves, but includes any tip portion that includes a first bend that engages with the bottom surface 115 of the outer engaging element 112 and a second bend that engages with the top surface 117 of the inner engaging element 114.

Referring now to FIGS. 4A and 4B, a process of removing a temple from a lens structure is shown. Referring first to FIG. 4A, a lens structure 410, similar to the lens structure 110, includes an outer engaging element 412 and an inner engaging element 414 similar to engaging elements 112, 114. A bridge 450 may also be fixed to the lens structure 410. In addition, a temple 430 similar to the first temple 130, includes an elongated portion 432 and a tip portion 434, which is securely engaged to the engaging elements 412, 414 of the lens structure 410. In order to disengage the tip portion 434 from the engaging elements 412, 414, a counter-clockwise force may be applied to the elongated portion 432 of the temple 430 in the direction indicated by the arrow 460 in FIG. 4A. In various embodiments, the elongated portion 432 may first be extended towards the plane of the tip portion 434 before applying the counter-clockwise or downward force. By applying the counter-clockwise force on the elongated portion 432 of the temple 430, the tip portion 434 rotates counter clockwise, disengaging the securing element 439 from the inner engaging element 414, and consequently disengaging the curved portions 436, 438 of the tip portion 434 from the engaging elements 412, 414 of the lens structure 410. Once the tip portion 434 is disengaged from the engaging elements 412, 414, as shown in FIG. 4B, the tip portion 434 may be lifted from the lens structure 410. Upon removing the temple 430 from the lens structure 410, the temple 430 may be mounted on a different lens structure, such as lens structure 510 as shown in FIGS. 5A and 5B.

Referring now to FIGS. 5A and 5B, the process of engaging a temple with a lens structure is shown. The temple 430 is placed on a lens structure 510 as shown in FIG. 5A. In order to engage the tip portion 434 of the temple 430 with the engaging elements of lens structure 510, the tip portion 436 is placed on the lens structure 510 such that the first curved portion 438 rests under the outer engaging element 512 and the second curved portion rests above the inner engaging element 514. A clockwise force may then be applied to the elongated portion 432 of the temple 430, as indicated by the arrows in FIG. 5A. By applying the clockwise force, the tip portion 434 may be rotated clockwise until the securing element 439 of the tip portion 434 engages with the corresponding surface of the inner engaging element 516 of the lens structure 510. Once the securing element 439 is engaged, the first curved portion 436 and the second curved portion 438 engage with the outer engaging element 512 and the inner engaging element 514 of the lens structure 510, as shown in FIG. 5B.

It should be appreciated that because the elongated portion 432 of the temple 430 rests above the ear of the person wearing the eyewear 100, the ear provides a continuous clockwise force to the temple 430 as long as the eyewear 100 is being worn by the person. As long as the clockwise force keeps the tip portion 434 engaged with the engaging elements 512, 514 of the lens structure 510, the temple 430 remains securely attached to the lens structure 510. To detach the temple 430 from the lens structure 510, the process described in FIGS. 4A and 4B may be repeated. In this way, the lens structure of the eyewear may easily and efficiently be changed.

Figure 6:
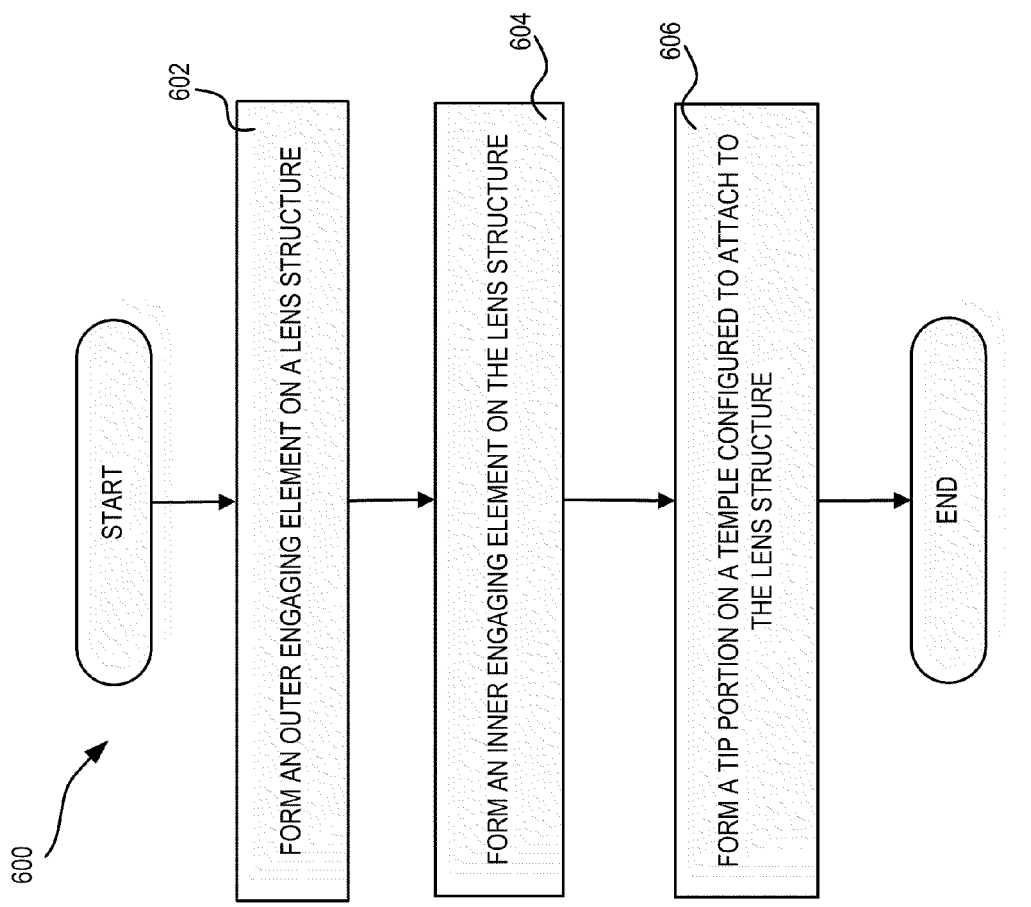
FIG. 6 is a logical flow diagram illustrating a process for making the eyewear shown in FIG. 1, according to various embodiments.

Referring now to FIG. 6, and using FIGS. 1, 2 and 3 as reference, a logical flow diagram illustrating the process of making eyewear is shown. It should be appreciated that more or fewer operations may be performed than shown in the figures and described herein. These operations may also be performed in parallel, or in a different order than those described herein.

The process 600 begins at operation 602, where the outer engaging element 112 is formed on the lens structure 110. As described above, the outer engaging element 112 may include a narrow stem 310 and an end portion 314 that is wider than the narrow stem 310. The outer engaging element 112 may be mounted on the front surface 111 of the lens structure 110 using an adhesive, or may be attached to the lens structure 110 via threads. In this way, the end portion 314 and the narrow stem 310 form a recessed portion with the front surface 111 of the lens structure 110. In the embodiment shown in FIG. 3, the narrow stem 310 may also include another end 312 that is attached to the front surface 111 of the lens structure 110 such that the recessed portion is defined by the narrow stem 310 and the end portions 312, 314. In alternate embodiments, the outer engaging element 112 may be defined within the thickness 115 of the lens structure 110.

From operation 602, the process 600 proceeds to operation 604, where the inner engaging element 114 is formed on the lens structure 110. As described above, the inner engaging element 114 and the outer engaging element 112 may be identical and therefore, may be formed in a similar manner. Moreover, the inner engaging element 114 may be formed relatively closer to the center 106 of the lens structure 110 than the outer engaging element 112. Further, in various embodiments, the inner engaging element 114 may also be formed relatively closer to the top edge 113 of the lens structure 110 than the outer engaging element 112. In this way, the tip portion may better engage with both the engaging elements 112, 114.

From operation 604, the process 600 proceeds to operation 606, where the tip portion 134 is formed on the temple 130. The tip portion 134 is configured to engage with the engaging elements 112, 114 of the lens structure 110. The tip portion 134 may include the first curved portion 136 that includes the first bend configured to engage with the bottom surface 115 of the outer engaging element 112. Moreover, the tip portion 134 may also include the second curved portion 138 that includes the second bend, which is configured to engage with the upper surface 117 of the inner engaging element 114. By forming the tip portion 134 to include the two curved portions 136, 138, the tip portion 134 may engage with the engaging elements 112, 114 in such a manner as to securely engage the temple 130 with the lens structure 110. Upon completing these operations, the process 600 may repeat these operations for the second lens structure 120 of the eyewear 100. In various embodiments, a similar process may be repeated for forming the bridge outer engaging element 116 and the bridge inner engaging element 118 for the lens structure 110, as well as for forming a tip portion 154 on the ends of the bridge 150. From operation 606, the routine 600 ends.

In various embodiments of the present disclosure, the eyewear may be utilized for various activities, including, but not limited to reading, wearing in bright conditions, or wearing at a shooting range for instance. The eyewear may further be configured to allow a protective shield to attach to the eyewear for various activities such as shooting. In addition, the eyewear system may also come with a plurality of temples such that a user can interchange the temples of the eyewear. For instance, a user who plays racquetball may find it desirable to interchange the temples with a pair of temples that are strapped together such that the eyewear does not come off. Other users may find it desirable from a fashion standpoint, where the temples may come in an assortment of colors. In this way, users may match the temples with the color of the apparel they are wearing.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. Eyewear, comprising:
   at least one lens structure comprising an outer engaging element and an inner engaging element positioned relatively closer to a center of the lens structure than the outer engaging element;
   at least one temple configured to removably attach to the at least one lens structure, the at least one temple comprising an elongated portion and a tip portion that comprises a first curved portion configured to engage with the outer engaging element, and
   a second curved portion configured to engage with the inner engaging element.

2. The eyewear of claim 1, wherein
   the first curved portion comprises a first bend configured to engage with a bottom surface of the outer engaging element; and
   the second curved portion comprises a second bend configured to engage with a top surface of the inner engaging element.

3. The eyewear of claim 1, wherein the outer engaging element and the inner engaging element are mounted on a front surface of the at least one lens structure.

4. The eyewear of claim 1, wherein
   the outer engaging element and the inner engaging element are defined within a thickness of the at least one lens structure; and
   the at least one lens structure comprises an aperture configured to receive the tip portion of the at least one temple.

5. The eyewear of claim 1, wherein the inner engaging element is arranged relatively closer to a top edge of the lens structure than the outer engaging element.

6. The eyewear of claim 1, wherein the at least one temple is flexible.

7. The eyewear of claim 1, wherein the second curved portion comprises a securing element configured to engage with a surface of the inner engaging element.

8. The eyewear of claim 1, wherein
   the outer engaging element comprising a first end configured to attach to the at least one lens structure and a second end separated from the first end by a stem such that the second end is wider than the stem; and
   the inner engaging element comprising a first end configured to attach to the at least one lens structure and a second end separated from the first end by a stem such that the second end is wider than the stem.

9. The eyewear of claim 1, further comprising
   a bridge outer engaging element and a bridge inner engaging element positioned relatively closer to a center of the lens structure than the outer engaging element;
   a bridge comprising a tip portion that comprises a first curved portion configured to engage with the bridge outer engaging element, and a second curved portion configured to engage with the bridge inner engaging element.

10. A method of making eyewear, comprising:
    forming an outer engaging element and an inner engaging element to a lens structure such that the inner engaging element is positioned relatively closer to a center of the lens structure than the outer engaging element;
    forming a tip portion on a temple configured to attach to the lens structure, the tip portion comprising a first curved portion configured to engage with the outer engaging element and a second curved portion configured to engage with the inner engaging element;

defining a first bend on the first curved portion configured to engage with a bottom surface of the outer engaging element; and defining a second bend on the second curved portion configured to engage with a top surface of the inner engaging element.

11. The method of claim 10, further comprising:

defining a recessed portion on the outer engaging element configured to secure the first curved portion of the tip portion; and defining a recessed portion on the inner engaging element configured to secure the second curved portion of the tip portion.

12. The method of claim 10, further comprising forming a securing element on the second curved portion configured to engage with a surface of the inner engaging element.

13. The method of claim 10, further comprising forming a bridge outer engaging element on the lens structure;

forming a bridge inner engaging element on the lens structure, the bridge inner engaging element positioned relatively closer to the center of the lens structure than the bridge outer engaging element; and forming a tip portion on a bridge element configured to engage with the bridge outer engaging element and the bridge inner engaging element.

14. The method of claim 10, wherein forming an outer engaging element and an inner engaging element to a lens structure comprises mounting the outer engaging element and the inner engaging element to a front surface of the lens structure.

15. The method of claim 10, wherein forming an outer engaging element and an inner engaging element to a lens structure comprises defining the outer engaging element and the inner engaging element within a thickness of the lens structure, and further comprising defining an aperture within the thickness of the lens structure configured to receive the tip portion of the temple.

16. An eyewear system, comprising:

a plurality of a pair of lens structures, each pair of lens structures comprising a first lens structure comprising a first outer engaging element and a first inner engaging element such that the first inner engaging element is positioned relatively closer to a center of the first lens structure than the first outer engaging element, and a second lens structure comprising a second outer engaging element and a second inner engaging element such that the second inner engaging element is positioned relatively closer to a center of the second lens structure than the second outer engaging element;

a bridge connecting the first lens structure and the second lens structure;

a first temple comprising an elongated portion and a first S-shaped tip portion configured to engage with the first outer engaging element and the first inner engaging element of the first lens structure; and a second temple comprising an elongated portion and a second S-shaped tip portion configured to engage with the second outer engaging element and the second inner engaging element of the second lens structure.

17. The eyewear system of claim 16, wherein the first S-shaped tip portion comprises a first curved portion configured to engage with the first outer engaging element and a second curved portion configured to engage with the first inner engaging element; and the second S-shaped tip portion comprises a first curved portion configured to engage with the second outer engaging element and a second curved portion configured to engage with the second inner engaging element.

18. The eyewear of claim 16, wherein the first curved portion of the first S-shaped tip portion comprises a first bend configured to engage with a bottom surface of the first outer engaging element;

the second curved portion of the first S-shaped tip portion comprises a second bend configured to engage with a top surface of the first inner engaging element;

the first curved portion of the second S-shaped tip portion comprises a first bend configured to engage with a bottom surface of the second outer engaging element; and the second curved portion of the second S-shaped tip portion comprises a second bend configured to engage with a top surface of the second inner engaging element.

19. The eyewear system of claim 16, wherein the first lens structure comprises a first bridge outer engaging element and a first bridge inner engaging element that is positioned relatively closer to the center of the first lens structure than the first bridge outer engaging element and the first bridge outer engaging element;

the second lens structure comprises a second bridge outer engaging element and a second bridge inner engaging element that is positioned relatively closer to the center of the second lens structure relative to the second bridge outer engaging element;

the bridge further comprises a first S-shaped tip portion comprising a first bend and a second bend, the first bend configured to engage with a bottom surface of the first bridge outer engaging element and the second bend configured to engage with a top surface of the first bridge inner engaging element; and the bridge further comprises a second S-shaped tip portion comprising a second bend and a second bend, the second bend configured to engage with a bottom surface of the second bridge outer engaging element and the second bend configured to engage with a top surface of the second bridge inner engaging element.

* * * * *